United States Patent Office 2,987,104
Patented June 6, 1961

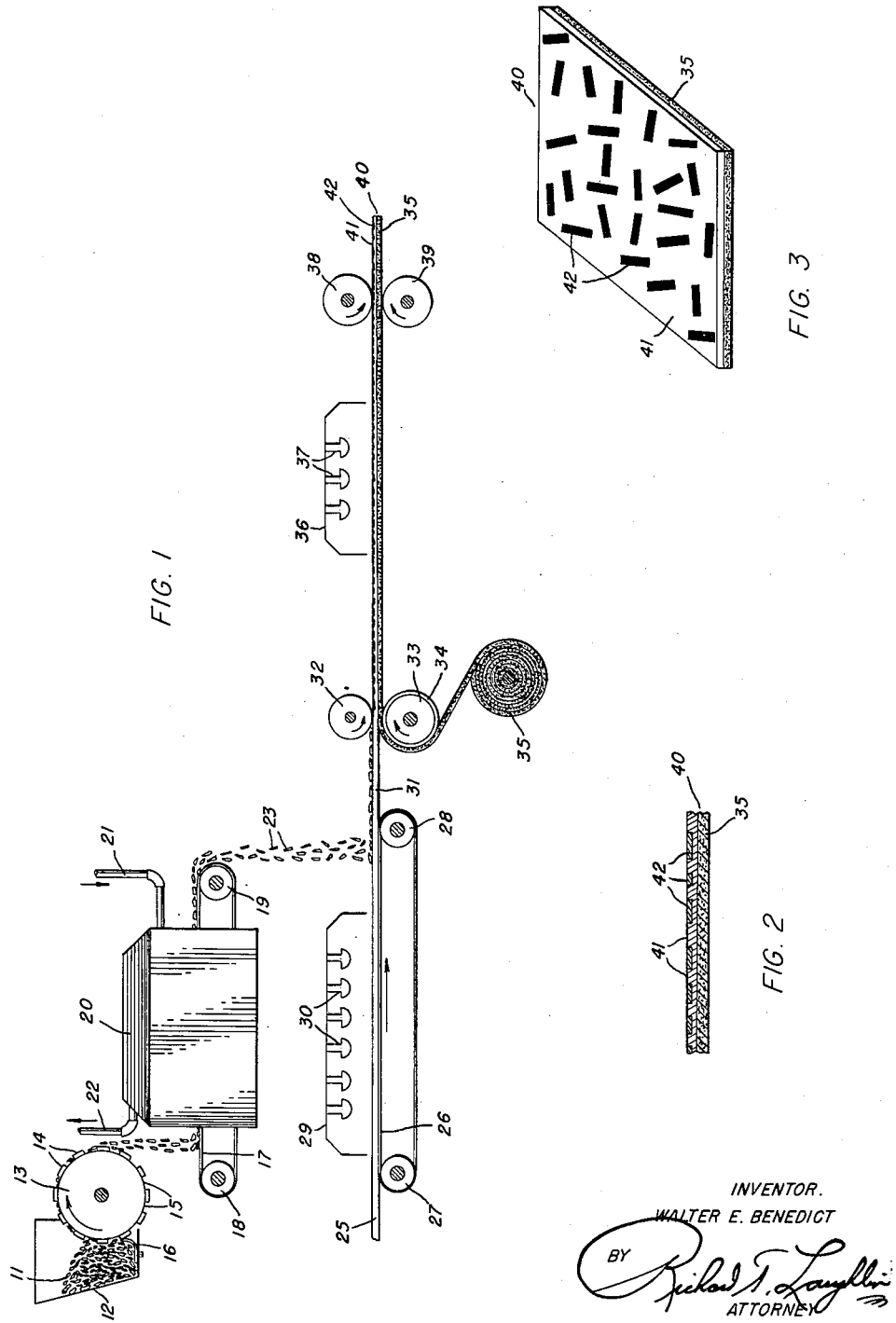

2,987,104
METHOD OF PRODUCING DECORATIVE SURFACE COVERING
Walter E. Benedict, Newtown, Pa., assignor to Congoleum-Nairn Inc., Kearny, N.J., a corporation of New York
Filed Sept. 19, 1957, Ser. No. 684,997
17 Claims. (Cl. 154—26)

This invention relates to linoleum useful as a surface covering for floors, walls and the like and in particular to a method of creating decorative effects in a linoleum surface covering.

Linoleum is a well known resilient surface covering which has been used for almost 100 years as a covering for floors, walls, articles of furniture and the like. Basically, the ingredients used in the production of linoleum today are similar to those in use when it was first discovered and, in general, comprise oxidized drying oils, resins, pigments and fillers. In the production of linoleum, a blend of these ingredients is sheeted by any one of a number of sheet-forming techniques, such as calendering and pressing. The composition sheet is bonded to a backing and finally is subjected to heat for extended periods of time to effect cure of the composition. Linoleum surface coverings are recognized as having long life and durability, good flexibility and resilience, as well as resistance to acids, alkalies and other soiling agents.

After the discovery of linoleum, it was initially produced primarily in the form of plain colored sheets. Although products of this type are manufactured today, they have been largely displaced by products with more intricate and appealing decorations. It was found at an early date that, if particles of colored linoleum composition were uniformly distributed into a mass of linoleum composition having a contrasting color, and then the resulting mass sheeted between calender rolls, attractive products could be produced. During calendering, the colored particles become distorted and smeared to yield long, colored streaks in the product. This effect is well known in the art as jaspé. Jaspé linoleum products are attractive and comparatively low in cost, but have the disadvantage that the decorative streaks penetrate only a small percentage of the thickness of the product. Thus, the decoration of the jaspé linoleum changes during wear after the product is installed. The colored streaks become cut and broken and, in some cases, disappear altogether.

Decorative linoleum with a decoration that remains unchanged for the life of the installation can be produced by the technique known as geometric inlaying. In this method, sections of the desired shape are cut from a linoleum base sheet and the openings so formed are filled with cut-outs taken from sheets of contrasting colors. The resulting composite sheet is calendered to fuse the components together. Since the decorative cut-outs extend the full thickness of the base sheet, it is apparent that linoleum so produced has the desirable property that the decoration remains unchanged during wear. However, such products are expensive to produce. The equipment needed for producing geometric linoleum in commercial quantities represents the investment of several hundred thousand dollars. In addition, in some patterns the cut-outs to be placed in the openings formed in the base sheet can represent as little as 10 percent of the total area of the sheet. The remaining 90 percent of the sheet used in forming the cut-outs must be chopped up and resheeted. This large percentage of reprocessing adds materially to the cost of producing such products. A further disadvantage of this technique is that, for each geometric effect desired, expensive cutting cylinders and dies must be produced.

Attempts to produce a linoleum surface covering having deeply and uniformly embedded, sharply defined, decorative elements on conventional linoleum calendering equipment have failed. When decorative linoleum composition is added to the surface of a sheet of linoleum composition and the resulting mass passed between calender rolls, the decorative composition becomes distorted and smeared. The resulting product is similar in nature to jaspé linoleum in that the decoration is primarily on the surface of the product and wear of the product causes changes in the appearance of the decoration. The decorative areas bear little, if any, similarity to the shape and size of the decorative composition.

It is an object of the invention to produce a decorative linoleum product having sharply defined, decorative elements which penetrate uniformly to a substantial depth in the product by using conventional linoleum manufacturing equipment. It is a further object of the invention to produce a decorative linoleum product with a decoration which does not change with wear requiring no reprocessing of material used to form the decorative stock. It is another object of the invention to produce in an economical manner a decorative linoleum product with decorative elements that extend to a substantial depth wherein the decoration can be readily changed. Other objects and the advantages of the invention will appear hereinafter.

In accordance with the invention, a decorative linoleum surface covering having sharply defined, undistorted areas of color which extend to a substantial depth in the produce is produced by embedding flat chilled pieces of colored linoleum composition into a heated linoleum composition base sheet.

The invention will be described with reference to the drawings wherein:

FIG. 1 is a schematic representation of the production of a decorative surface covering in accordance with one embodiment of the invention;

FIG. 2 is an enlarged cross-sectional view of the product produced by the method shown in FIG. 1;

FIG. 3 is a pictorial view of the product produced in accordance with the method of FIG. 1.

Figure 4:
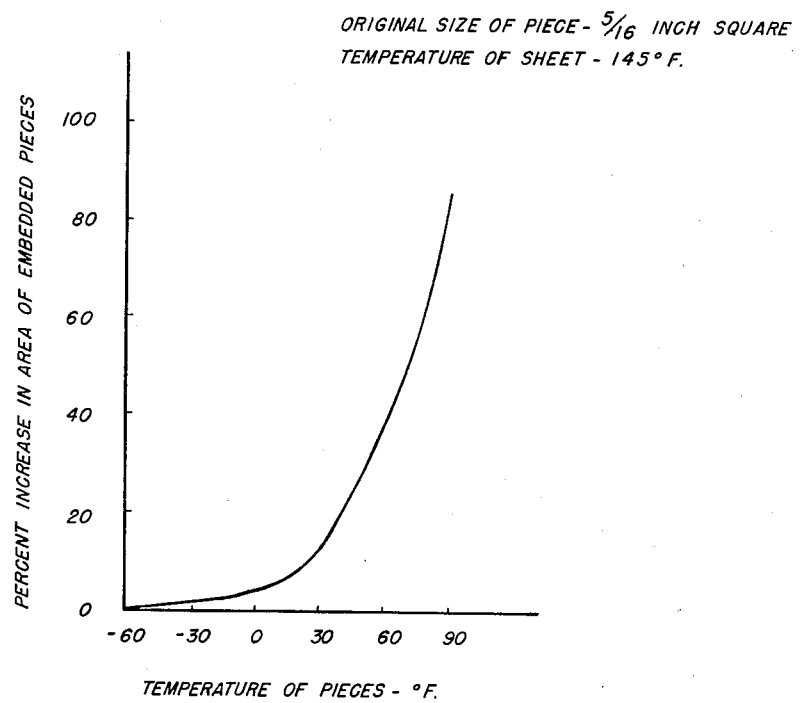
FIG. 4 is a graph showing the effect on the area of the embedded pieces when pieces of linoleum composition having different temperatures are embedded into a heated linoleum composition base sheet.

With reference to the drawing, flat decorative pieces 11 of uncured linoleum composition are maintained in a feed hopper 12. One side of the feed hopper is formed by a rotating drum 13, the circumference of which is provided with a plurality of evenly spaced projections 14 which extend the full length of the drum. The projections form a plurality of spaces 15. The drum is rotated at a uniform rate removing pieces from the hopper in the spaces formed by the projections on the drum. The bottom of the feed hopper is provided with resilient sealing member 16 to prevent leakage of pieces from the hopper. The pieces fall from the side of the drum opposite to that in contact with the hopper upon a metal conveyor belt 17 which extends around and is driven by wheels 18, 19. The layer of pieces is carried by the motion of the belt through a cooling chamber 20 which is provided with cooling fluid inlet and outlet conduits 21, 22 to yield chilled pieces 23 which fall from the end of the metal conveyor belt. A base sheet of uncured linoleum composition 25 is carried by a heat resisting conveyor belt 26 which passes around and is driven by wheels 27, 28 through an oven 29 containing a plurality of radiant heating elements 30. The chilled pieces 23 fall upon the heated base sheet 31 which passes immediately to an embedding and laminating unit formed by an upper steel roll 32 and a lower roll 33 bearing a heat resistant rubber cover 34. A sheet 35 of impregnated felt passes over the rubber covered roll and engages the heated linoleum composition sheet 31 in the nip between the two rolls. The resulting composite sheet passes beneath an oven 36 with radiant heating elements 37 and thereafter between two steel rolls 38, 39 to produce a smooth surfaced product 40. The wearing surface 41 comprises a plurality of decorative areas 42 which extend to a substantial depth and which have a shape which closely conforms to that of the original pieces 11.

The composition used to form both the decorative pieces and the base sheet in which they are embedded is any composition which is well known in the art as linoleum composition. Such a composition comprises a blend of oxidized and partially polymerized drying oils, resins, pigments and fillers. Any of the drying or semi-drying oils which are characterized by being oxidized and polymerized to a hard, tough, consistency by the application of heat can be used. Such oils as linseed oil, soybean oil, China-wood oil, perilla oil and the like are typical drying oils used in the manufacture of linoleum. Suitable drying oils are characterized by being those in which oxidation yields a substantial amount of the oxidized glycerides of linoleic and linolenic acids. Synthetic drying oils, such as those derived from tall oil and other similar substances, can be used.

In the production of linoleum binder, the drying oils can either be partially oxidized alone and thereafter blended with suitable resins, followed by further oxidation, or the raw drying oils can be blended directly with resins and oxidized in a single stage. The resinous material used is conventionally rosin or its derivatives, such as ester gum and the like; but other resinous materials, such as congo ester, coumarone resins, kauri gum, synthetic resins of the phenol-formaldehyde type and the like can be used. During the oxidation process, it is conventional that small proportions of metallic dryers, such as the metallic salts of lead, manganese and the like, be used.

At the conclusion of the oxidation, which by the single stage process normally requires from 12 to 30 hours at a temperature of 180° F., the mass of oxidized drying oil and resin is withdrawn from the kettle in the form of a rubber-like gel. This mass, after being cooled, is mixed with pigments and fillers to produce the linoleum composition. The filler content will normally comprise a mixture of vegetable fillers, such as cork, wood flour and the like and mineral fillers, such as whiting, clay, asbestos and the like. The composition is pigmented using conventional organic or inorganic pigment, according to the particular color desired. Conventional linoleum compositions will normally comprise from 25 percent to 50 percent by weight of a blend of drying oil plus resin (normally referred to as linoleum binder) and from 50 percent to 75 percent by weight of pigments and fillers. The resin content of the linoleum binder is normally between 15 percent and 35 percent by weight of the amount of drying oil plus resin.

The composition produced as described above is sheeted in the conventional manner, such as by calendering or pressing. Various conventional decorative effects can be created in the resulting sheets in accordance with the well-known techniques of the prior art, that is, both the base sheet and the sheet from which the decorative pieces are to be cut can be either plain or formed in the jaspé, marbleized or other well known decorative effects of the prior art.

The decorative linoleum composition which is to form the decorative elements of the finished product produced in accordance with the invention is in the form of flat pieces of linoleum composition. The pieces can be in the form of regular geometric shapes, such as rectangles, squares, triangles and the like, or they can be in the form of irregularly shaped pieces. The pieces can be produced in any suitable way, as by cutting or breaking a preformed sheet or by transversely slicing an extruded body whose cross section has the desired shape. In order that the pieces can be readily embedded into the base sheet without appreciable distortion of either the base or the sheet, pieces should not have an area of greater than about 2¼ square inches. Pieces of this size or smaller can be embedded in the base sheet in accordance with the invention with only a minimum amount of lateral or longitudinal displacement of the base sheet. Where pieces of larger size are used, considerable distortion of the base sheet can occur during the embedding operation, the process in such cases being more akin to lamination than true embedding. Such distortion is not desirable where a product having a smooth surface is to be produced. The use of flat pieces having a surface area of 1 square inch or less is particularly effective.

The thickness of the decorative pieces is related to the thickness of the base sheet into which they are embedded. Conventionally, linoleum is produced in three different gauges with a thickness of wear surface ranging from 0.032 inch up to 0.125 inch. For satisfactory embedding of pieces into a base sheet in accordance with the invention, the pieces must have a thickness which is less than that of the thickness of the finished sheet. Since the thickness of the pieces represents substantially the depth of the decorative effect produced in the finished product, it is normally preferred in producing products having the optimum wearing qualities that pieces be used which are as thick as can be satisfactorily embedded. It is preferred that pieces having a thickness between ⅓ and ¾ of the thickness of the product be used.

In creating decorative effects in linoleum in accordance with the invention, the pieces are normally sprinkled on a base sheet in a random fashion. This means that the pieces will tend to land with the face bearing the largest area in the upright position. Consequently, for proper control of decoration, it is essential that the relative dimensions of the pieces be controlled so that the desired face lands upright substantially all the time during the chip feeding. This requires that the minimum face dimension of the piece be at least twice the thickness of the piece. For example, where pieces are to be embedded into a standard gauge linoleum base sheet having a thickness of 0.052 inch, the pieces should be from 0.017 to 0.039 inch in thickness. Thus, in this case the minimum face dimension of the pieces should be from 0.034 to 0.078 inch.

In accordance with the invention, the pieces are chilled prior to being embedded in the base sheet. A convenient way of measuring the physical properties of linoleum to determine the degree of chilling necessary in the production of products in accordance with the invention is to subject chilled linoleum composition in sheet form to a controlled pressure over a limited surface area for a definite length of time. The extent of the penetration of the object into the composition in such a test is an inverse function of the hardness of the composition. It is preferred in producing products in accordance with the invention that the pieces be refrigerated until they show a penetration of less than about 12 percent of the thickness of the composition. In the carrying out of the penetration test, a 0.25 inch diameter smooth metal cylinder is placed upon a sample of a linoleum composition sheet and a weight of 6 pounds is applied for a period of 60 seconds. This corresponds to a pressure of 122.4 pounds per square inch. The sheet is refrigerated and is maintained at a controlled temperature during the test. At the end of 60 seconds, the amount of penetration of the cylinder into the sheet is measured. When a conventional Randall and Stickney dial gauge is used, the amount of penetration can be read directly on a dial at the conclusion of the test. The actual penetration divided by the thickness of the sheet is the percentage penetration at the temperature of the sheet during the test.

The term percentage penetration as used in the specification and claims refers to the result of a determination made by the method outlined above. Pieces of linoleum composition refrigerated to show a percentage penetration of between 4 percent and 10 percent are particularly effective in the production of products in accordance with the invention.

Although there are minor differences in penetration at a given temperature depending on the ingredients used in formulation of the linoleum cement and in the length of time which the linoleum composition has aged, there is normally a direct relation between the percentage penetration and the temperature of the piece. Pieces of linoleum composition chilled to a temperature of less than 32° F. normally have a percentage penetration of less than 12 percent and pieces chilled to a temperature between minus 20° F. and plus 26° F. normally have a percentage penetration of between 4 percent and 10 percent.

The relation between piece temperature and the appearance of the finished product is presented in graphical form in FIGURE 4. In FIGURE 4, the percent increase in the area of an embedded piece as compared to the area of the original piece prior to embedding is shown as a function of the temperature of the piece. FIGURE 4 demonstrates that when pieces are chilled to temperatures below 32° F., only slight increase in the area of the pieces occurs during embedding. At higher temperatures, the area of the pieces increases markedly during embedding with resulting distortion of the piece. For example, at 90° F., the area increases 86 percent during embedding, with considerable distortion in the shape of the embedded piece as compared to the original piece prior to embedding. It has been found that when 5/16 inch square pieces of linoleum composition are embedded in a linoleum composition sheet with an increase in area of 15 percent or less, this results in negligible distortion in the shape of the embedded piece as compared to that of the original. When the piece temperature is such that greater than 15 percent area increase occurs, objectionable rounding of the corners of the embedded piece and other forms of distortion become evident. With reference to FIGURE 4 an area increase of 15 percent corresponds to a piece temperature of 32° F. at which temperature linoleum composition shows a percentage penetration of 12 percent.

The chilling of the pieces can be brought about in different ways. The pieces can be carried on a conveyor belt through a cooling chamber as shown in the drawing or the pieces can be stored in a room, the temperature of which is held at the temperature to which it is desired to chill the pieces. The chilling can be produced with any conventional refrigeration system. For example, systems using compression or absorption systems are well known in the art and can readily produce the temperatures desired in the invention. Where continuous chilling of the pieces in the manner shown in FIG. 1 is to be carried out, a refrigeration system capable of producing temperatures at least 20° F. lower than the temperature to which the pieces are to be refrigerated is particularly desirable. This will insure that the pieces can be refrigerated to the proper temperature rapidly. Using such a continuous method, a supply of a gas such as air, carbon dioxide or the like is refrigerated, passed to the cooling chamber and is then recirculated through the refrigeration system. The temperature of the pieces leaving the cooling chamber can be measured and used to control the temperature or quantity of refrigerated gas supplied to the cooling chamber. This will insure a close control in the temperature of the chilled pieces leaving the cooling chamber. The use of a metal conveyor belt upon which the pieces lie and are then carried through a cooling chamber in a continuous manner is particularly desirable. The metal belt becomes chilled and aids in removing heat from the pieces by conduction, thus insuring rapid chilling of the pieces.

In accordance with the invention, a base sheet of linoleum composition must be heated prior to the deposition of the chilled pieces thereon. The base sheet is formed from linoleum composition in the conventional manner and can be decorated with any of the conventional effects of the prior art. Thus, the base sheet can be not only a plain colored sheet, but can be formed with a jaspé, marbleized or any other conventional decoration. The sheet is heated by conventional means, as for example by radiant heating elements or in a forced air convection type oven. The sheet should be heated to a temperature where it shows a percentage penetration of at least about 80 percent. The penetration percentage is determined in the manner described in connection with the chilled pieces. That is, a force of 6 pounds is applied for 60 seconds to a 0.25 inch diameter cylinder, one end of which is resting on the heated sheet. The distance the cylinder penetrates the sheet, divided by the thickness of the sheet, is the percentage penetration. Base sheets heated to a temperature where they show a percentage penetration of between 80 percent and 90 percent are particularly effective for use in the invention. Linoleum composition sheets heated to a temperature of about 110° F. normally show a percentage penetration of about 80 percent and at a temperature of 160° F., a percentage penetration of 90 percent. Base sheets heated to show a percentage penetration of greater than 90 percent can be used, but are not as satisfactory. The relatively higher temperature of such sheets can cause excessive heat transfer to the chilled pieces resting thereon prior to embedding with the result that the decoration in the product tends to become smeared due to undue softening of the pieces. The base sheet composition should have about the same curing characteristics as that of the composition used to form the pieces. The use of highly aged, hard composition for formation of pieces and fresh soft composition for formation of the base sheet is not possible, since uniform cure of the product would not be possible.

The step of heating the base sheet of linoleum composition is not always necessary. For example, where the sheet has just been formed by calendering or pressing, it frequently will be at the correct temperature for proper embedding of chilled pieces in accordance with the invention when it leaves the sheet-forming step.

When the base sheet has attained the temperature required for it to show the desired penetration percentage, as outlined above, the chilled pieces are embedded therein. As illustrated in FIG. 1, the chilled pieces are sprinkled upon the heated base sheet in an amount conforming to the decoration desired. In the production of a product having a random type decoration, as shown in the drawing, the rate of feeding of the pieces can be synchronized with the rate of motion of the base sheet to insure even distribution of the pieces over the surface of the moving base sheet. Various distribution devices, such as screens, baffles and the like, can be interposed between the base sheet and supply of falling pieces to slow down the rate of fall of the pieces and to aid in the attainment of uniform distribution. The quantity of pieces to be used compared to the base sheet is governed by the density of decorative elements desired in the product. Normally, products having from about 5 percent to about 25 percent of the surface area representing decorative elements formed from embedded chilled pieces are particularly attractive.

In some cases where a more regular decorative effect is desired, the chilled pieces can fall through travelling stencils, with the result that only certain defined areas of the base sheet are covered. Alternately, where chilled pieces with several different sets of geometric shapes are to be embedded into the base sheet, separate chip chilling and feeding means can be provided for each shape, thus insuring that the proper amount of each shape is applied to the base sheet.

In accordance with the invention, the chilled pieces are embedded and fused into the base sheet. This step can be carried out either as a batch process as in a conventional flat bed press or between rolls which is continuous. From the standpoint of operating speed and economy, embedding in a continuous process is preferred. In the embodiment illustrated in FIGURE 1, embedding is effected in a planishing unit wherein the chilled pieces are pressed into the base sheet by contact with a smooth metal roll and the sheet is supported on the resilient surface of the back-up roll. Hydraulic pressure in the range of about 400 to about 1,000 pounds per lineal inch is applied to force the chilled pieces into the base sheet.

One of the features of products produced in accordance with the invention is the presence of sharply defined, unsmeared decorative elements that extend to a substantial depth in the product. The pieces become embedded without smearing or distortion. It is desirable that the surface used for pressing the pieces into the sheet be chilled so as to minimize heat transfer between the warm base sheet and the pieces. For satisfactory embedding without distortion the pressing surface must be at a lower temperature than that of the heated base sheet. For best results, the pressing surface should be at a temperature of less than 100° F. A temperature of the pressing surface between 50° F. and 90° F. is particularly effective. Cooling is brought about by circulating properly chilled cooling fluid through the pressing surface. The pressing surface is conventionally formed from highly polished metal in order that a desirable finish is imparted to the product.

It is essential that the embedding step be carried out immediately after the chilled pieces have been sprinkled on the heated base sheet. If the chilled pieces remain for too long a time upon the heated sheet prior to embedding, heat transfer from the sheet can result in warming of the pieces so that distortion of the pieces occurs during embedding. It is preferred that the time between deposition of the pieces and the embedding step not exceed about 10 seconds with a time of less than 5 seconds being particularly effective.

The surface upon which the base sheet is supported during the embedding step preferably is of a resilient, flexible nature in order to insure uniform application of pressure to all areas of the sheet. A layer of heat resistant rubber material, which can withstand high pressure such as polymerized chloroprene, chlorosulfonated polyethylene and the like, forms a satisfactory resilient surface for the pressing surface. In a continuous embedding process as illustrated in FIGURE 1, a layer of resilient material can be formed on the surface of a metal roll. Where a batch pressing method is used, the pressing surface which supports the base sheet during the embedding step can be covered with a layer of resilient material.

The temperature of the pressing surface covered with resilient material is preferably maintained at or near the temperature of the base linoleum composition sheet in order to insure satisfactory control of the embedding process. This result is attained by circulation of a temperature-regulating fluid through the interior of the pressing surface.

Linoleum composition in sheet form must be bonded to a strengthening backing prior to cure of the composition to produce finished linoleum. The backing is an essential element in the finished product since it imparts to the product the ability to withstand strains resulting from handling the product during installation. In addition, the backing is necessary since uncured linoleum composition is relatively weak and soft and linoleum composition sheets hung in curing ovens without a backing would invariably tear and break. In the embodiment illustrated in FIGURE 1 the embedding of decorative chips and lamination of the linoleum composition sheet to the strengthening backing is carried out simultaneously. The lower rubber covered roll of the embedding unit is ideally suited as a laminating roll since the rubber can effectively absorb the effect of any irregularities in the backing material. Also, the pressure conditions for embedding are ideal for lamination of a linoleum sheet to a backing. Backings of woven fabric, such as burlap, cotton and the like, or felted fibrous sheets are well known in the linoleum art. Felted fibrous sheets, prepared from fibrous materials on a web-forming machine, such as a Fourdrinier or cylinder machine, are ideal backing sheets for linoleum if impregnated with a water-proofing and strengthening saturant. Such saturants as asphalt, thermoplastic resins such as polyvinyl acetate, coumarone resins, and the like, elastomeric resins, such as rubber, butadiene-styrene copolymer, polymerized chloroprene and the like, and thermosetting resins, such as phenolformaldehyde resin, oxidized natural and synthetic drying oils and the like can be used.

FIGURE 1 illustrates an embodiment of the invention wherein the chilled pieces are embedded into the heated base sheet and simultaneously the sheet is laminated to a backing. Although this method is preferred, the embedding of the chilled pieces can take place prior to the lamination to the backing. When this is done this rubber covered bottom roll of the embedding unit can be replaced by a steel roll although close control of roll spacing will be necessary in order to insure satisfactory and uniform embedding of the decorative pieces. The backing sheet can then be laminated to the product in a subsequent lamination step. FIGURE 1 illustrates the embedding and lamination taking place in a continuous operation between rolls. These steps can, of course, be carried out in other equipment such as a flat bed press. Use of the flat bed press, however, requires an intermittent operation and therefore is not preferred.

The invention has been described with reference to a single embedding operation. However, unusual decorative effects can be created by embedding chilled pieces in a heated base sheet and then applying additional chilled pieces to the surface of the sheet followed by a second embedding step. It is apparent that an extremely wide variety of decorative effects can be created in accordance with the invention by varying the shape of the pieces embedded and by using multiple embedding steps.

Regardless of the embodiment used in the embedding step, the chilled pieces are pressed their full thickness into the linoleum composition base sheet. There is substantially no distortion of the edges or appearance of the pieces; that is, the decorative elements formed in the product have the same shape, character and size as the chilled pieces. The flat pieces are embedded evenly to form areas of color in the product having flat parallel sides extending into the sheet. This highly desirable result insures that as the product wears, the appearance of the decorative elements will remain unchanged up to their full depth of penetration.

Temperature equalization between the embedded pieces and the base sheet frequently results in the formation of small bulges in the surface of the base sheet which bears the decorative piece. This is due to thermal expansion of the pieces after embedding. Therefore, it is frequently desired that the sheet be subjected to a further pressing step after the pieces have been embedded therein. Prior to this final pressing the sheet is preferably heated to a temperature between about 120° F. and 140° F. The heated sheet is then passed beneath a pressing surface. The final pressing can be carried out between calender rolls or in a flat bed or rotary press. It is preferred that the pressing surface which engages the decorative surface of the product be maintained at normal room temperatures, that is between 50° F. and 90° F.

The product is then stoved or cured in the manner conventional in the manufacture of linoleum surface coverings. Conventionally, the product is hung in long loops in large ovens or stoves and held at a temperature of about 140° F. to about 180° F. for a period of about three to six weeks. The cured product removed from the stove can be used in the form of sheets or can be cut up into tiles or other appropriate shapes as desired. After cure the product can be bonded to a resinous foam backing, such as foam rubber or foam vinyl resin where a product with high resilience is desired.

The uncured product comprising a plurality of sharply defined, uniformly embedded, decorative elements can be further processed in ways conventional in the linoleum art prior to cure. For example, where the chilled pieces are embedded into a relatively thick sheet, the product after embedding can be calendered to reduce the gauge with resulting elongation of the decorative elements to yield many interesting effects. Alternately, where the pieces are embedded into a base jaspé sheet, the product can be cut, shingled and calendered transversely with respect to the jaspé streaks in the conventional manner used in the production of marbleized linoleum. The decorative elements form a plurality of streaks similar to brush strokes which lie on the marbleized background. Other techniques well known in the linoleum art can be applied to the sheet bearing the embedded refrigerated pieces produced in accordance with the invention to produce unusual decorative effects.

The following examples are given for purposes of illustration:

*Example I*

A mixture of 75 parts linseed oil and 25 percent rosin was agitated in a kettle in the presence of air at a temperature of 180° F. until it became a rubber-like gel. Different batches of linoleum binder so prepared were pigmented different colors to produce batches of linoleum composition having the following composition:

| | Percent by weight |
|---|---|
| Linoleum binder | 36 |
| Wood flour | 29 |
| Pigments and mineral fillers | 35 |
| | 100 |

Each batch of composition was individually mixed and extruded in ¼ inch diameter shapes (known in the linoleum industry as "doggies"). Batches of pink and white pigmented doggies were blended to form a uniform heterogeneous mass which was then sheeted between calender rolls to form a base jaspé sheet of linoleum composition having a thickness of 0.078 inch.

Six separate batches of linoleum composition pigmented blue, green, yellow, pink, grey and black were individually sheeted between calender rolls to form plain colored sheets having a thickness of 0.034 inch. These sheets were cut into flat rectangular pieces with a thickness of 0.034 inch and ranging in size from 0.075 by 0.25 inch to 0.18 by 0.50 inch. These pieces were then uniformly blended and chilled to a temperature of −10° F. Sheeted linoleum composition of the type used to form the pieces showed a percentage penetration of 4.5 percent at −10° F.

The base sheet of jaspé linoleum was heated to a temperature of 140° F. where it showed a percentage penetration of 87 percent. The chilled pieces were sprinkled upon the heated sheet of linoleum composition to cover about 10 percent of the surface area of the sheet. The sheet was immediately passed between a chilled iron roll at a temperature of 65° F. and a rubber covered pressure roll at a temperature of 140° F. The chilled pieces were in contact with the sheet for 3 seconds prior to being embedded. The chilled iron roll pressed the pieces into the heated sheet to a depth of 0.030 inch. The sheet was simultaneously laminated to an asphalt impregnated felt backing having a thickness of 0.040 inch.

The product was then passed between calender rolls to smooth the product. The embedded pieces appeared in the product as decorative elements which has substantially the same shape and size as the original rectangular pieces. The pieces showed an average percent increase in area of 4 percent during the embedding and showed no rounding of corners or other distortion.

The resulting product was cured at 165° F. for 4 weeks to yield a finished linoleum surface covering, having a wearing surface with a thickness of 0.052 inch.

*Example II*

The product of FIGURE 1 prior to cure was cut into lengths, the lengths turned at right angles to the jaspé streaks, and shingled to yield a thickness of 4 sheets at all points. This mass was passed between calender rolls. The jaspé streaks were spread and broken to yield a marble-like appearance. The embedded pieces were elongated roughly 4-fold in the direction of calendering to yield individual unbroken strands of color in the product. This sheet was then cured at 165° F. for 4 weeks to yield a finished linoleum surface covering.

Linoleum produced in accordance with the invention by embedding refrigerated pieces of linoleum composition into a base linoleum composition sheet is characterized by having sharply defined decorative elements which extend to a substantial depth into the sheet. The decoration remains unchanged during wear of the product after installation. The method has great flexibility in that different decorative effects can be created merely by changing the shape, distribution or number of pieces used. The change in decoration requires no additional investment as is required in producing geometric inlaid products. Further changes in decoration can be brought about by additional calendering or cross-calendering the sheet bearing the embedded pieces.

Any departure from the above description which conforms to the present invention is intended to be included within the scope of the claims.

I claim:

1. A method of producing a decorative linoleum composition sheet which comprises distributing a plurality of flat chilled pieces of uncured linoleum composition on the surface of a flat heated sheet of uncured linoleum composition, pressing said chilled pieces into said sheet to form a plurality of sharply defined decorative elements which extend to a substantial depth into said sheet from said surface thereof, said elements conforming in shape and size to said pieces, said heated sheet showing a percentage penetration of at least about 80 percent and said chilled pieces showing a percentage penetration of less than about 12 percent.

2. The method acording to claim 1 wherein said pieces have a thickness of about ⅓ to ¾ that of said decorative linoleum composition sheet and have a top surface area of less than about 2¼ square inches.

3. The method according to claim 2 wherein said pieces are embedded into said sheet by contact with a smooth pressing surface maintained at a temperature of less than 100° F.

4. A method of producing a decorative linoleum composition sheet which comprises heating an uncured linoleum composition sheet to a temperature of at least 110° F., depositing upon a surface of said heated sheet a plurality of flat pieces of uncured linoleum composition chilled to a temperature of less than 32° F. and pressing said chilled pieces into said heated sheet with a smooth pressing surface maintained at a temperature of less than 100° F. thereby embedding and fusing said pieces into said sheet to form a plurality of sharply defined decorative elements which extend uniformly to a substantial depth into said sheet from said surface thereof and which conform in shape and size to said pieces.

5. The method according to claim 4 wherein said pieces have a thickness of about ⅓ to ¾ that of said decorative linoleum composition sheet and have a top surface area of less than about 2¼ inches.

6. The method according to claim 5 wherein said pieces cover from 5 percent to 25 percent of the surface of said sheet.

7. A method of producing a decorative linoleum composition sheet which comprises heating an uncured linoleum composition sheet to a temperature of at least 110° F. at which it shows a percentage penetration of at least 80 percent, chilling a plurality of flat pieces of uncured linoleum composition to a temperature of less than 32° F. at which said pieces show a percentage penetration of less than about 12 percent, depositing said chilled pieces upon a surface of said heated sheet to cover from 5 percent to 25 percent of said surface, and immediately passing said sheet with said chilled pieces deposited on said surface into the nip between calender rolls, the upper roll having a smooth surface maintained at a temperature of less than 100° F., thereby embedding and fusing said pieces into said sheet to form a plurality of sharply defined decorative elements which extend uniformly to a substantial depth into said sheet from said surface thereof and which conform in shape and size to said pieces.

8. The method according to claim 7 wherein the elapsed time between the deposition of said chilled pieces upon said heated sheet and the passing of said sheet with said chilled pieces deposited thereon to said nip is less than about 10 seconds.

9. A method of producing a decorative linoleum surface covering for floors, walls and the like which comprises heating an uncured linoleum composition sheet to a temperature of from 110° F. to 160° F. at which it shows a percentage penetration of between 80 percent and 90 percent, chilling a plurality of flat pieces of uncured linoleum composition to a temperature of less than 32° F. at which sheeted linoleum composition of the type used in the formation of said pieces shows a percentage penetration of less than about 12 percent, depositing said chilled pieces upon a surface of said heated sheet, pressing said chilled pieces into said heated sheet with a smooth pressing surface maintained at a temperature of less than 100° F. while simultaneously laminating the side of said sheet opposite to that bearing said pieces to a backing, thereby embedding and fusing said pieces into said sheet to form a plurality of sharply defined decorative elements which extend uniformly to a substantial depth into said sheet from said surface thereof and which conform in shape and size to said pieces and curing the laminated product to produce said linoleum surface covering.

10. The method according to claim 9 wherein said pieces have a thickness of between ⅓ and ¾ that of said sheet having said pieces embedded therein and have a top surface area of less than about 2¼ equare inches, the minimum face dimension of said pieces being at least twice their thickness.

11. A method of producing a decorative linoleum surface covering for floors, walls and the like which comprises heating an uncured linoleum composition sheet to a temperature of from 110° F. to 160° F. at which it shows a percentage penetration of between 80 percent and 90 percent, chilling a plurality of flat pieces of uncured linoleum composition having colors which contrast with said heated sheet to a temperature of less than 32° F. at which said pieces show a percentage penetration of less than about 12 percent, depositing said chilled pieces upon the upper surface of said heated sheet to cover from 5 percent to 25 percent of said surface, passing said heated sheet with said chilled pieces deposited upon the upper surface thereof into the nip between a pair of spaced calender rolls, the upper roll which engages said chilled pieces having a smooth surface maintained at a temperature of 50° F. to 90° F. and the lower roll having a resilient surface, simultaneously passing a backing sheet over said lower roll into said nip to engage the lower surface of said heated sheet thereby embedding and fusing said pieces into said heated sheet to form a plurality of sharply defined decorative elements which extend uniformly to a substantial depth into said sheet from said upper surface thereof and laminating said sheet to said backing to form a laminated sheet, said decorative elements conforming in shape and size to said pieces, and curing said laminated sheet to produce said linoleum surface covering.

12. The method according to claim 11 wherein said pieces have a thickness of between ⅓ and ¾ that of said sheet having said pieces embedded therein and have a top surface area of less than about 2¼ square inches.

13. The method according to claim 12 wherein said pieces are chilled to a temperature of −20° F. to +26° F. at which said pieces show a percentage penetration of 4 percent to 10 percent.

14. The method according to claim 12 wherein the elapsed time between the deposition of said chilled pieces upon said heated sheet and the arrival of said sheet with the chilled pieces upon the upper surface thereof into said nip is less than about 10 seconds.

15. The method according to claim 14 wherein said elapsed time is less than 5 seconds.

16. A method of producing a decorative linoleum composition sheet which comprises embedding a plurality of chilled pieces of uncured linoleum composition at a temperature of less than 32° F. into a surface of a heated uncured linoleum composition sheet heated to a temperature of greater than about 110° F. thereby forming a plurality of sharply defined decorative elements which extend to a substantial depth into said sheet from said surface thereof and which conform in shape and size to said pieces, heating said sheet with said pieces embedded therein to a temperature of about 120° F. to about 140° F. and passing said so heated sheet into the nip between a pair of closely spaced calender rolls thereby providing a smooth weaing surface on said decorative linoleum composition sheet.

17. The method according to claim 15 wherein the surface of said calender roll which engages the surface of said sheet into which said chilled pieces have been embedded is maintained at a temperature of 50° F. to 90° F.

References Cited in the file of this patent

UNITED STATES PATENTS

| | | |
|---|---|---|
| 1,001,836 | Fritz | Aug. 29, 1911 |
| 1,939,045 | Fredriksen | Dec. 12, 1933 |
| 2,154,438 | Conklin | Apr. 18, 1939 |
| 2,835,620 | Bartlett | May 20, 1958 |
| 2,867,263 | Bartlett | Jan. 6, 1959 |